United States Patent [19]
Kato et al.

[11] Patent Number: 5,899,767
[45] Date of Patent: May 4, 1999

[54] ELECTRICAL CONNECTOR WITH MOVABLE MECHANISM

[75] Inventors: Hironori Kato; Masanori Nakao; Kimihiro Furuichi, all of Miyagi-ken, Japan

[73] Assignee: Alps Electric Co., Ltd., Japan

[21] Appl. No.: 08/820,296

[22] Filed: Mar. 18, 1997

[30] Foreign Application Priority Data

Mar. 19, 1996 [JP] Japan .................................... 8-063151

[51] Int. Cl.$^6$ .................................................. H01R 13/64
[52] U.S. Cl. .......................................... 439/247; 439/164
[58] Field of Search ............................... 439/13, 15, 164, 439/246–248

[56] References Cited

U.S. PATENT DOCUMENTS

| | | | |
|---|---|---|---|
| 5,238,420 | 8/1993 | Miyahara et al. | 439/164 |
| 5,328,381 | 7/1994 | Seymour et al. | 439/247 |
| 5,385,481 | 1/1995 | Kotyuk | 439/248 |
| 5,516,303 | 5/1996 | Yohn et al. | 439/248 |
| 5,667,398 | 9/1997 | Kidd et al. | 439/248 |

*Primary Examiner*—Steven L. Stephan
*Assistant Examiner*—Brian J. Biggi
*Attorney, Agent, or Firm*—Brinks Hofer Gilson & Lione

[57] ABSTRACT

An external connector mounted on a printed circuit board of a steering system is composed of a first movable carriage to which flexible terminals are secured, a second movable carriage for guiding the first movable carriage in the X direction, and a support carriage for guiding the second movable carriage in the Y direction so that the first and second movable carriages can move in the X and Y directions, respectively, with respect to the support carriage. When a fixed direct coupler of a rotary connector is connected to the thus constructed external connector, if the fixed direct coupler is displaced with respect to the external connector, the first and second movable carriages of the external connector move in the X and Y directions, respectively, with respect to the support carriage, whereby the relative displacement between the fixed direct coupler and the external connector can be absorbed.

18 Claims, 5 Drawing Sheets

FIG. 9
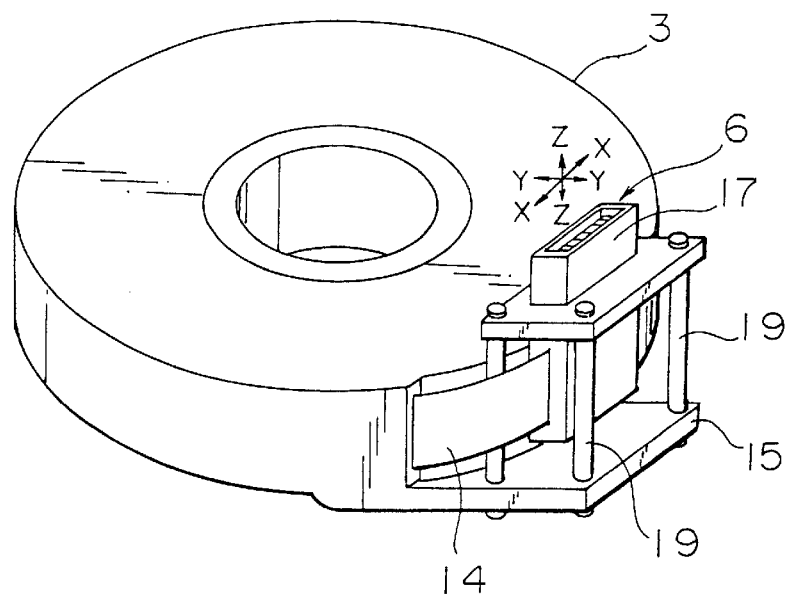
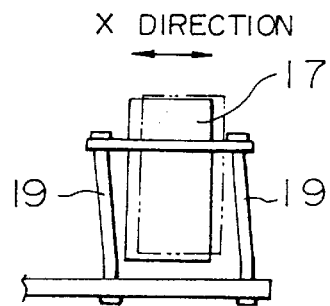
FIG. 10A
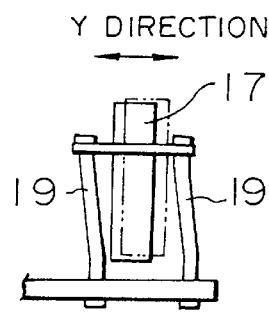
FIG. 10B
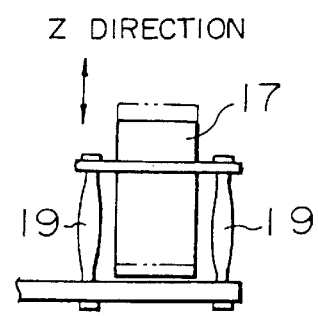
FIG. 10C

ELECTRICAL CONNECTOR WITH MOVABLE MECHANISM

BACKGROUND OF THE INVENTION

1. Field of the Invention

The present invention relates to an electrical connecting apparatus for providing continuity between two devices with a direct coupling type connector, and more particularly, to an electrical connecting apparatus suitable for use between a rotary connector and a steering system of an automobile.

2. Description of the Related Art

A rotary connector is briefly comprised of a pair of housings connected so as to be rotatable relative to each other, and a flexible cable wound in a storage section defined between the housings. Both ends of the flexible cable are electrically led out of each of the housings while being fixed thereto. One of the housings is used as a movable member and the other one is used as a stationary member. When the movable housing is rotated in either clockwise and counterclockwise directions, the flexible cable is wound unwound in the storage section in accordance with the direction of rotation.

The rotary connector thus briefly constructed is incorporated in a steering system of an automobile which is an external device, and used as an electrical connecting means such as an air bag circuit or a horn circuit in such a manner that a movable housing is mounted to a steering wheel which is a rotor member, and a fixed housing is mounted to a combination switch which is a stator member. It is necessary to connect an external connector of the external device, such as an air bag inflator and a horn switch, etc. to the flexible cable of the rotary connector, so the tip of the flexible cable led out of the housing is provided with connector terminals corresponding to the external connector.

Hitherto, as disclosed in U.S. Pat. No. 5,229,544 for example, direct coupling type rotary connectors have been known in which the connector terminals (direct coupler) is fixed to the housing itself, and the external connector of an external device is directly connected to the direct coupler. Since the direct coupler is formed integrally with the housing, such rotary connectors not only provide an easier assembly operation in which the rotary connector is mounted at a predetermined position of the steering system and the direct coupler is simultaneously connected to the external connector, but also simplify the structure and are advantageous in reducing the size thereof, as compared with rotary connectors of the type in which the tip of the flexible cable or a lead wire led out of the housing is provided with a specialized connector.

In the above conventional direct coupling type rotary connectors, the direct coupler is formed integrally with the housing and the direct coupler is connected to the external connector when the rotary connector is mounted at the predetermined position of the steering system. Therefore, unless the direct coupler of the rotary connector and the external connector of the steering system are correctly aligned, it becomes difficult to connect the direct coupler to the external connector. Particularly, when a guide mechanism for guiding the rotary connector to the mounting position of the steering system is adopted for the purpose of improving assembly operability, there arises a problem in that the direct coupler cannot be connected to the external connector when the direct coupler and the external connector are even slightly displaced from each other.

Such a problem also arises in various electrical connecting apparatuses for providing continuity between two devices with a direct coupling type connector.

SUMMARY OF THE INVENTION

It is an object of the present invention to provide an electrical connecting apparatus in which at least one of a direct coupler of a first device and an external connector of a second device is provided with a movable mechanism for absorbing the relative displacement therebetween, whereby, even if the mounting positions of the first and second devices vary slightly, the variation is absorbed by the movable mechanism, so that the direct coupler can be securely connected to the external connector.

According to an aspect of the present invention, there is provided an electrical connecting apparatus, comprising: a first device having a direct coupler; and a second device having an external connector to which the first device is mounted at a predetermined position, and connected to the direct coupler, wherein at least one of the direct coupler and the external connector is provided with a movable mechanism for absorbing the relative displacement therebetween.

Any component may be employed for the first and the second devices so long as they are directly coupled at the same time they are mounted. However, the first device is preferably a rotary connector for providing continuity between a pair of rotatably connected housings through a flexible cable, and the second device is preferably a steering wheel of a steering system of an automobile, or a device fixed to a vehicle body of the automobile.

In addition, when an insertion guide for fitting the rotary connector is provided on the steering wheel, or a device fixed to at the vehicle body, and a displacement correction portion is provided between the direct coupler and the external connector, the direct coupler can be easily inserted into the external connector.

Any component may be used for the movable mechanism so long as it can absorb the relative displacement between the direct coupler and the external connector. For example, a movable mechanism may be employed which is composed of a pair of movable carriages controlled to move in directions perpendicular to each other, and flexible terminals held by the movable carriages.

In addition, a movable mechanism may be employed which is composed of a support carriage for supporting a flexible cable, and movable carriages movably connected to the support carriage through the flexible cable.

Further, a movable mechanism may be employed which is composed of a movable carriage movably connected to the support carriage through elastic members, and flexible terminals held by the movable carriage. Particularly, when the elastic members are three dimensionally deformable, the movable mechanism can absorb not only the horizontal (X and Y directions) displacement but also the vertical (Z direction) displacement.

BRIEF DESCRIPTION OF THE DRAWINGS

FIG. 9 is a perspective view showing further embodiment of the movable mechanism; and FIGS. 10A, 10B and 10C illustrate an operation of the movable mechanism shown in FIG. 9.

DESCRIPTION OF THE PREFERRED EMBODIMENT

The preferred embodiments will be described with reference to the accompanying drawings.

Figure 1:
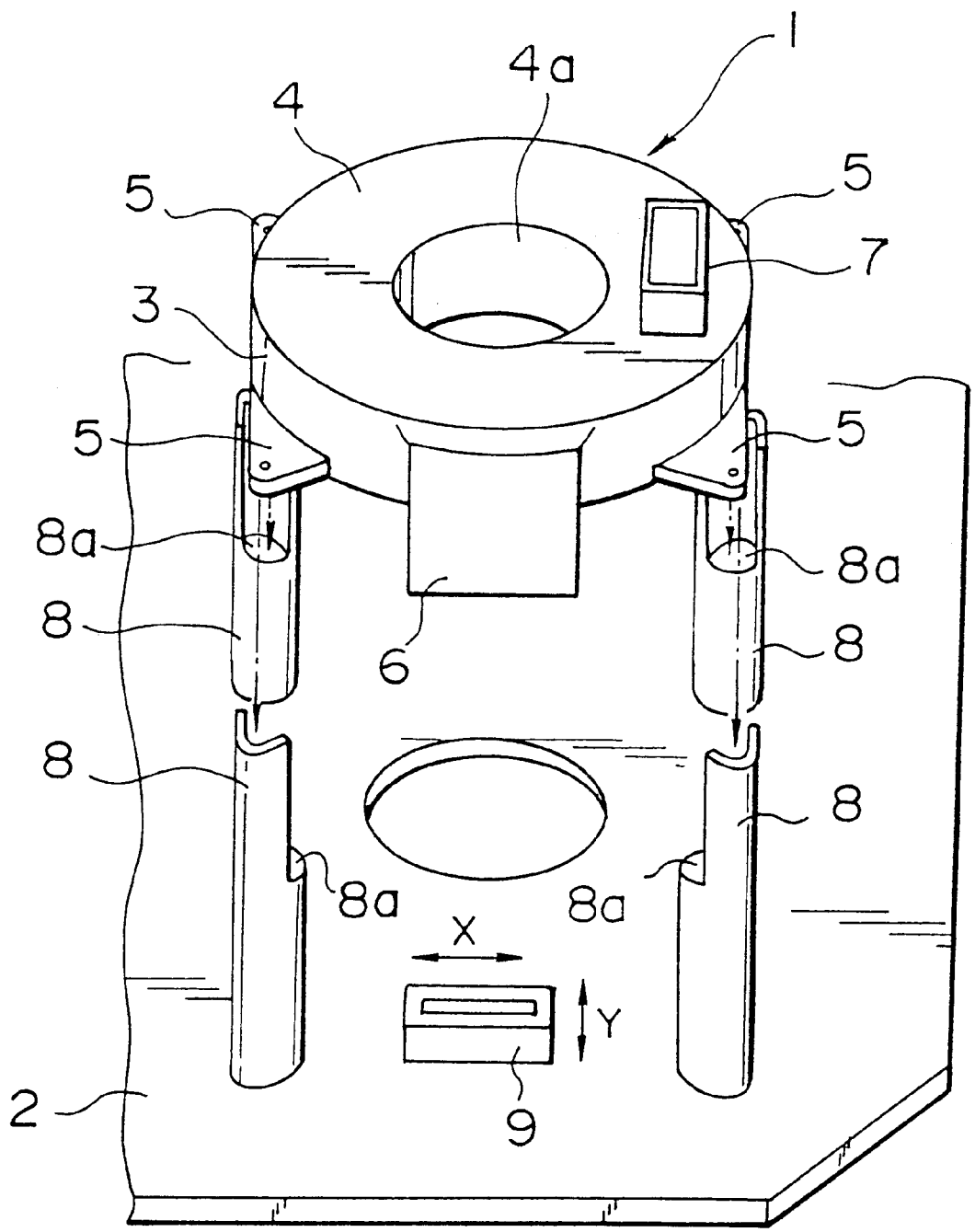
FIG. 1 is a perspective view showing a rotary connector and a printed circuit board according to an embodiment of the present invention.

Referring to FIG. 1, a rotary connector 1 (a first device) is fitted on a printed circuit board 2 (a second device), and the printed circuit board 2 is previously fixed inside a combination switch, etc. of a steering system (not shown). The rotary connector 1 is briefly comprised of a fixed housing 3 and a movable housing 4 connected so as to be rotatable; and a flexible cable (not shown) which is wound into the housings 3 and 4 in a spiral form, for example. The fixed housing 3 has a plurality of mounting pieces 5 formed thereon, and a shaft insertion hole 4a is formed in the center of the movable housing 4. The flexible cable is a flat cable in which a plurality of conductors are laminated by a belt-shaped insulating film, and one end thereof is guided to a fixed direct coupler 6 formed integrally with the fixed housing 3, and connected to connector pins (not shown) in the fixed direct coupler 6. The other end of the flexible cable is guided to a movable direct coupler 7 formed integrally with the movable housing 4, and connected to connector pins (not shown) inside the movable direct coupler 7.

On the other hand, a plurality of columns 8 are disposed on the printed circuit board 2, and each column 8 has a stepped portion 8a, which is a mounting surface of the fixed housing 3, at the center thereof. An external connector 9 is mounted on the printed circuit board 2, and the external connector 9 can be moved by a movable mechanism, which is described later, in the X and Y directions. The fixed direct coupler 6 of the rotary connector 1 is connected to the external connector 9, and an external connector provided on a steering wheel (not shown) is connected to the movable direct coupler 7.

Figure 2:
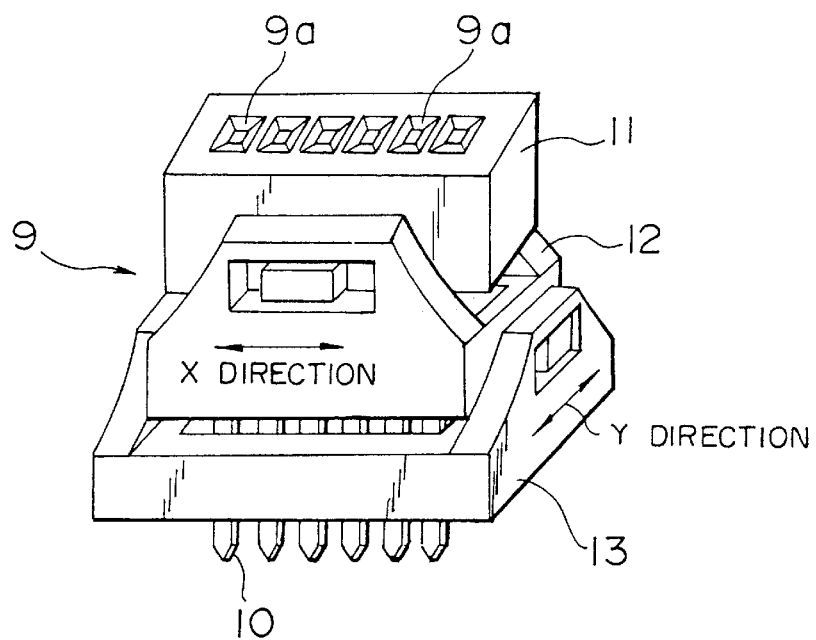
FIG. 2 is a perspective view showing an embodiment of a movable mechanism.
Figure 3:
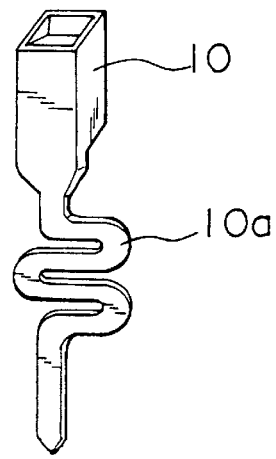
FIG. 3 is a perspective view showing a terminal included in the movable mechanism shown in FIG. 2.

As shown in FIG. 2, the external connector 9 comprises a first movable carriage 11 for holding a plurality of terminals 10, a second movable carriage 12 for guiding the first movable carriage 11 in the X direction, and a support carriage 13 for guiding the second movable carriage 12 in the Y direction, so as to form the above-described movable mechanism. As shown in FIG. 3, a flexure 10a is formed in the middle of each terminal 10, thereby providing sufficient flexibility to the terminal 10. Each terminal 10 is projected from the lower surface of the support carriage 13, and soldered to a land (not shown) of the printed circuit board 2.

Figure 4:
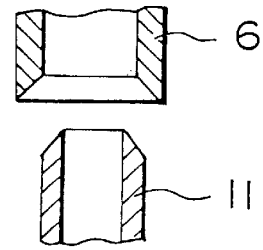
FIG. 4 illustrates mating portions of a direct coupler and an external connector.

In the embodiment constructed as described above, in order to incorporate the rotary connector 1 into the steering system, a steering shaft (not shown) is first inserted in the shaft insertion hole 4a of the rotary connector 1, and the rotary connector 1 is pushed toward the printed circuit board 2 with each mounting piece 5 positioned while being guided by the corresponding column 8. When each mounting piece 5 is pushed until it strikes the stepped portion 8a, the fixed direct coupler 6 is inserted into the first movable carriage 11 of the external connector 9, whereby connector pins (not shown) of the fixed direct coupler 6 are connected to the terminals 10 of the external connector 9. At this time, if the fixed direct coupler 6 is slightly displaced with respect to the external connector 9, undesirable stress is applied to a connection although a connector fitting is made. However, the pins of the direct coupler 6 strike a tapered portion 9a serving as a displacement correction portion around a pin socket of the external connector 9 so as to move the first and second movable carriages 11 and 12 of the external connector 9 in the X and Y directions, respectively, with respect to the support carriage 13, whereby the relative displacement between the fixed direct coupler 6 and the external connector 9 is absorbed and the undesirable stress applied to the connection is eliminated, so that a reliable electrical connection can be obtained. As another example of the displacement connection portion, either or both mating portions of the fixed direct coupler 6 and the first movable carriage 11 are chamfered, as shown in FIG. 4. The chamfering allows the fixed direct coupler 6 to be easily inserted into the external connector 9 even though the fixed direct coupler 6 and the external connector 9 are slightly displaced to each other. Thereafter, each mounting piece 5 is secured to the stepped portion 8a of each column 8 by screws, whereby installation of the fixed housing 3 in the steering system is completed.

Then, a steering hub is pressed into the steering shaft, a steering wheel integral with the steering hub is locked with the movable housing 4, and an external connector (not shown) attached to the steering wheel is connected to the movable direct coupler 7, whereby installation of the movable housing 4 in the steering system is completed. At this time, when the external connector attached to the steering wheel is provided with the same movable mechanism as that of the external connector 9 mounted on the printed circuit board 2, the relative displacement between the external connector attached to the steering wheel and the movable direct coupler 7 is absorbed, so that a reliable electrical connection can be obtained. In addition, when either or both mating portions of the movable direct coupler 7 and the external connector attached to the steering wheel are chamfered in such a manner as shown in FIG. 4, the movable coupler 7 and the external connector attached to the steering wheel can be easily fitted even though they are slightly displaced from each other.

In the above-described embodiment, an insertion guide is provided on each column 8. However, if a screw guide hole (not shown) is provided in each stepped portion 8a of the column 8 instead of the insertion guide, the fixed direct coupler 6 is inserted into the external connector through the displacement correction portion by screwing in a screw through each hole of the mounting piece of the rotary connector 1. In this case, the screw guide hole provided in the stepped portion 8a and the screw screwed therein serve as the insertion guide.

Figure 5:
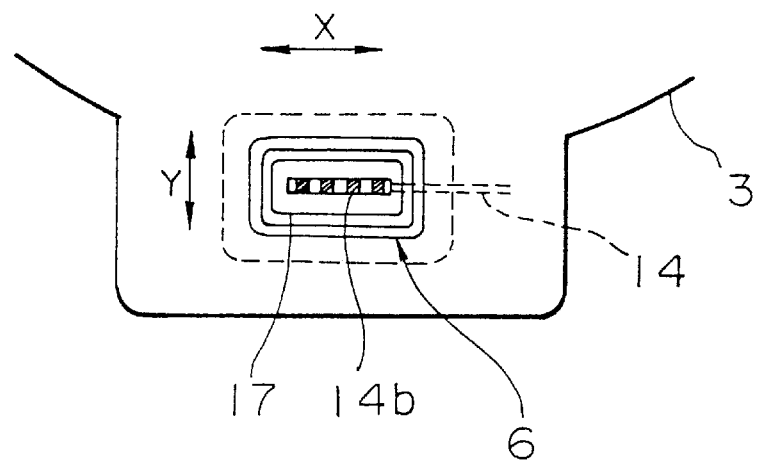
FIG. 5 is a plan view showing another embodiment of the movable mechanism.
Figure 6:
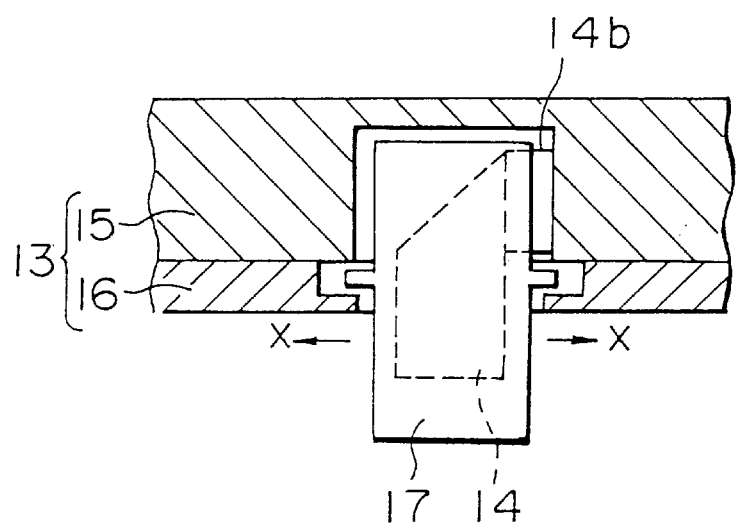
FIG. 6 is a sectional view of FIG. 5 taken in one direction.
Figure 7:
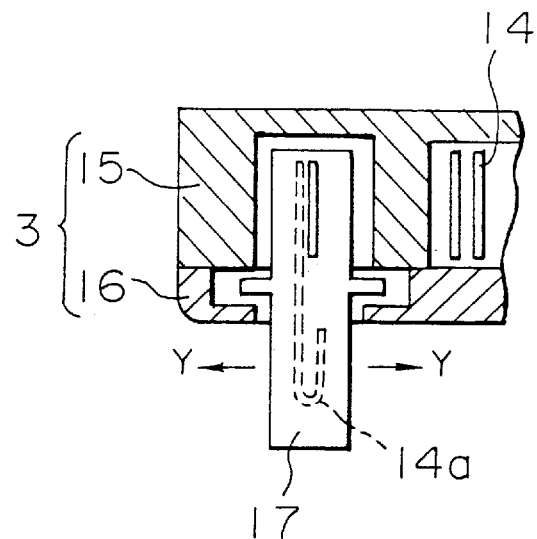
FIG. 7 is a sectional view of FIG. 5 taken in another direction.

In addition, in the above-described embodiment, although the movable mechanism for absorbing the relative displacement between the fixed direct coupler 6 and the external connector 9 is provided on the external connector 9, such a movable mechanism may be provided on the fixed direct coupler 6. That is, as shown in FIGS. 5 to 7, one end of the flexible cable 14 is fixed to a support carriage 15 of the fixed housing 3, and then guided to a movable carriage 17 movably arranged between the support carriage 15 and a bottom plate 16, so that the movable mechanism of the fixed direct coupler 6 is formed by the flexible cable 14 and the movable carriage 17. One end of the flexible cable 14 is fixed to the movable carriage 17 through a coupling portion 14a and bent back in the movable carriage 17 so that leading directions thereof are perpendicular to each other, and a plurality of conductors 14b forming connector terminals are exposed at the bent back portion.

According to the embodiment constructed as described above, in installing the fixed housing 3 of the rotary connector 1 on a predetermined position of the steering system, even if the fixed direct coupler 6 of the rotary connector 1 is displaced with respect to the external connector 9 of the steering system, the coupling portion 14a of the flexible cable 14 is deformed to move the movable carriage 17 in the X and Y directions, whereby the relative displacement between the fixed direct coupler 6 and the external connector 9 is absorbed, so that a reliable electrical connection can be obtained without application of undesirable stress to the connection.

Figure 8:
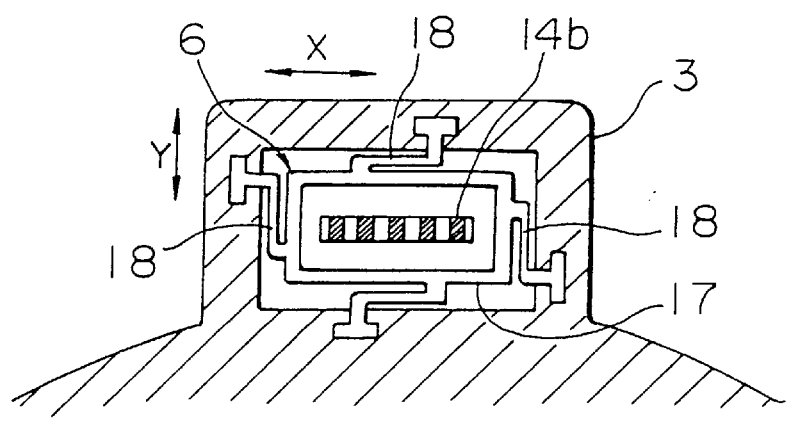
FIG. 8 is a plan view showing another embodiment of the movable mechanism.

According to another embodiment shown in FIG. 8, the movable carriage 17 of the fixed direct coupler 6 is coupled to the fixed housing 3 through four elastic arms 18, and the elastic arms 18 and the movable carriage 17 form the movable mechanism of the fixed direct coupler 6. In this case, although the conductors 14b of the flexible cable 14 are exposed in the movable carriage 17 to form connector terminals, it is also possible to use flexible terminals, such as those shown in FIG. 3. Each of the elastic arms 18 are formed integrally on four surfaces of the movable carriage 17 which are perpendicular to each other. By deformation of the elastic arms 18, the movable carriage 17 moves in the X and Y directions so as to absorb the relative displacement between the fixed direct coupler 6 and the external connector 9, whereby a reliable electrical connection can be obtained.

According to a further embodiment as shown in FIG. 9, the movable carriage 17 of the fixed direct coupler 6 is coupled to a support carriage 15 of the fixed housing 3 through four elastic columns 19, and the elastic columns 19 and the movable carriage 17 form the movable mechanism of the fixed direct coupler 6. Each of the elastic columns 19 are formed of a compression deformable material, such as rubber, and arranged to absorb the relative displacement between the support carriage 15 and the movable carriage 17. The flexible cable 14 led out of the fixed housing 3 is guided to the movable carriage 17, and conductors 14a are exposed in the movable carriage 17 to form connector terminals.

According to the embodiment constructed as described above, in installing the fixed housing 3 of the rotary connector 1 to a predetermined position of the steering system, even if the fixed direct coupler 6 of the rotary connector 1 is displaced with respect to the external connector 9 of the steering system, each of the elastic columns 19 are deformed to move the movable carriage 17 in the X and Y directions, as shown in FIGS. 10A and 10B, whereby the relative displacement between the fixed direct coupler 6 and the external connector 9 is absorbed. In addition, in inserting the fixed direct coupler 6 into the external connector 9, even if the connector terminals thereof are displaced in the direction of insertion, each of the elastic columns 19 are compressed and deformed to move the movable carriage 17 in the Z direction, as shown in FIG. 10C. Therefore, the movable mechanism of the fixed direct coupler 6 can absorb not only the horizontal (in the X and Y directions) displacement but also the vertical (in the Z direction) displacement, whereby the connector terminals of the fixed direct coupler 6 and those of the external connector 9 can be securely connected.

Incidentally, the movable mechanism of the fixed direct coupler 6 shown in FIGS. 5 to 10 may be applied to the movable direct coupler 7. In addition, when both of the housings 3 and 4 of the rotary connector 1 are used as direct connectors, the movable mechanism may be applied to the fixed direct coupler 6 and the movable direct coupler 7, respectively.

As described above, according to the present invention, at least one of the direct coupler (first device) and the external connector (second device) are provided with the movable mechanism for absorbing relative displacement therebetween. Therefore, even if the mounting positions of the first and second devices vary slightly, the variation can be absorbed by the movable mechanism, whereby the direct coupler can be securely connected to the external connector, and a reliable electrical connection can be obtained.

What is claimed is:

1. An electrical connecting apparatus, comprising:

a rotary connector having a direct coupler; and a second device having an external connector, said first device being mounted at a predetermined position on said second device such that said external connector is connected to said direct coupler, wherein at least one of said direct coupler and said external connector are provided with a movable mechanism for absorbing a relative displacement therebetween.

2. An electrical connecting apparatus according to claim 1, wherein said movable mechanism includes a pair of movable carriages controlled to move in directions perpendicular to each other, and flexible terminals held by said movable carriages.

3. An electrical connecting apparatus according to claim 2, wherein said rotary connector provides an electrical connection between a pair of rotatably connected housings through a flexible cable, and said second device is one of a steering wheel of a steering system of an automobile, and a device fixed to a vehicle body of the automobile.

4. An electrical connecting apparatus according to claim 3, wherein insertion guides for fitting said rotary connector are provided on said one of said steering wheel and the device fixed to the vehicle body, and a displacement correction portion is provided between said direct coupler and said external connector.

5. An electrical connecting apparatus according to claim 1, wherein said rotary connector provides an electrical connection between a pair of rotatably connected housings through a flexible cable, and said second device is one of a steering wheel of a steering system of an automobile, and a device fixed to a vehicle body of the automobile.

6. An electrical connecting apparatus according to claim 5, wherein insertion guides for fitting said rotary connector are provided on said one of said steering wheel and the device fixed to the vehicle body, and a displacement correction portion is provided between said direct coupler and said external connector.

7. An electrical connecting apparatus, comprising:

a first device having a direct coupler; and a second device having an external connector, said first device being mounted at a predetermined position on said second device such that said external connector is connected to said direct coupler, wherein at least one of said direct coupler and said external connector are provided with a movable mechanism for absorbing a relative displacement therebetween, wherein said movable mechanism includes a movable carriage movably connected to a support carriage through elastic members, and flexible terminals held by said movable carriage.

8. An electrical connecting apparatus according to claim 7, wherein said elastic members are three dimensionally deformable.

9. An electrical connecting apparatus according to claim 8, wherein said first device is a rotary connector for providing an electrical connection between a pair of rotatably connected housings through a flexible cable, and said second device is one of a steering wheel of a steering system of an automobile, and a device fixed to a vehicle body of the automobile.

10. An electrical connecting apparatus according to claim 9, wherein insertion guides for fitting said rotary connector are provided on said one of said steering wheel and the device fixed to the vehicle body, and a displacement correction portion is provided between said direct coupler and said external connector.

11. An electrical connecting apparatus according to claim 7, wherein said first device is a rotary connector for providing an electrical connection between a pair of rotatably connected housings through a flexible cable, and said second device is one of a steering wheel of a steering system of an automobile, and a device fixed to a vehicle body of the automobile.

12. An electrical connecting apparatus according to claim 11, wherein insertion guides for fitting said rotary connector are provided on said one of said steering wheel and the device fixed to the vehicle body, and a displacement correction portion is provided between said direct coupler and said external connector.

13. An electrical connecting apparatus, comprising:

a rotary connector for providing an electrical connection between a pair of rotatably connected housings, said rotary connector having a direct coupler; and a second device including one of a steering wheel of an automobile steering system, and a device fixed to a vehicle body, the second device having an external connector connected to said direct coupler, wherein at least one of said direct coupler and said external connector are provided with a movable mechanism for absorbing a relative displacement therebetween.

14. An electrical connecting apparatus according to claim 13, wherein insertion guides for fitting said rotary connector are provided on said second device.

15. An electrical connecting apparatus according to claim 14, wherein a displacement correction portion is provided between said direct coupler and said external connector.

16. An electrical connecting apparatus, comprising:

a rotary connector for providing an electrical connection between a pair of rotatably connected housings, said rotary connector having a direct coupler; and a second device including one of a steering wheel of an automobile steering system, and a device fixed to a vehicle body, the second device having an external connector connected to said direct coupler, wherein at least one of said direct coupler and said external connector are provided with a movable mechanism for absorbing a relative displacement therebetween, and insertion guides for fitting said rotary connector are provided on said second device.

17. An electrical connecting apparatus according to claim 16, wherein a displacement correction portion is provided between said direct coupler and said external connector.

18. An electrical connecting apparatus, comprising:

a first device having a direct coupler; and a second device having an external connector, said first device being mounted at a predetermined position on said second device such that said external connector is connected to said direct coupler, wherein at least one of said direct coupler and said external connector are provided with a movable mechanism comprising at least one movable carriage for absorbing a relative displacement between said direct coupler and said external connector after said direct coupler is connected to said external connector.

* * * * *